United States Patent [19]

Okazaki

[11] Patent Number: 4,993,995

[45] Date of Patent: Feb. 19, 1991

[54] TOOTHED-BELT FIXING MECHANISM

[75] Inventor: Noritaka Okazaki, Kadoma, Japan

[73] Assignee: Mita Industrial Co., Ltd., Osaka, Japan

[21] Appl. No.: 418,634

[22] Filed: Oct. 10, 1989

[30] Foreign Application Priority Data

Oct. 29, 1988 [JP] Japan .................................. 63-141742
Oct. 29, 1988 [JP] Japan .................................. 63-141743

[51] Int. Cl.$^5$ .............................................. F16G 1/00
[52] U.S. Cl. ..................................... 474/152; 474/140
[58] Field of Search ............... 474/152, 153, 140, 101; 101/111; 198/837, 841, 814

[56] References Cited

U.S. PATENT DOCUMENTS

| | | | |
|---|---|---|---|
| 2,718,153 | 9/1955 | Dean | 474/140 |
| 4,027,587 | 6/1977 | Tschinkel et al. | 474/153 X |
| 4,492,304 | 1/1985 | Geis | 474/140 X |

Primary Examiner—Thuy M. Bui
Attorney, Agent, or Firm—Wenderoth, Lind & Ponack

[57] ABSTRACT

A toothed-belt fixing mechanism allows an end portion of a toothed-belt to be inserted between a toothed-pulley rotatable only in one direction and a guide member positioned so that a predetermined gap is formed between the guide member and peripheral teeth of the toothed-pulley. Teeth of the toothed-belt engage with the peripheral teeth of the toothed-pulley.

6 Claims, 6 Drawing Sheets

TOOTHED-BELT FIXING MECHANISM

BACKGROUND OF THE INVENTION

1. Field of the Invention

The present invention relates to a toothed-belt fixing mechanism. As employed herein, the terms "fixing" or "to fix" indicate both the case where one end portion of the toothed-belt is fixed and the case where both end portions of the toothed-belt are connected with each other to form an endless belt.

2. Description of the Prior Art

The toothed-belt has been used in various types of movable member-driving apparatus requiring an appointed timing, such as an optical system-driving apparatus in an optical system travel type copying machine, a printing head-driving apparatus in a printer, a driving apparatus of an automatic door and a travelling-driving apparatus of a robot car truck.

When one end portion of such a toothed-belt is fixed, as shown in FIG. 9, an end portion of a toothed-belt (a) is positioned between an uneven plate (b) having a plurality of teeth engaging with teeth of belt (a) and a flat plate (c) and is fixedly mounted on a stationary portion or member (e), such as the body of a copying machine, by means of screws (d) passing through members (a), (b), (c).

The above described conventional toothed-belt has the following problems.

That is to say, when the toothed-belt (a) is fixed, it is necessary that it be fixed under tension. However, with such known fixing method it has been shown to be remarkably difficult to fix the toothed-belt (a) under an appropriate tension.

Accordingly, in the case of, for example, an apparatus such as an optical system-driving apparatus in a large-sized optical system travel type copying machine, in which a central movable member is driven by means of a pair of toothed-belts disposed on opposite sides of the movable member, it is difficult to balance the tensions on such two oppositely positioned toothed-belts. As a result, the movable member is not capable of moving smoothly during various operating circumstances.

In addition, in a case where it is necessary to regulate the tension on the belt due to extension of the belt, the regulating operation also is difficult.

On the other hand, for example, in the production of a long endless toothed-belt such as an endless toothed-belt used in a driving apparatus of an automatic door, opposite end portions of the toothed-belt are connected with each other to form an endless belt.

In such a case as shown in FIG. 10, opposite end portions of a toothed-belt (a) are positioned between an uneven plate (b) provided with teeth engaging with teeth of belt (a) and a flat plate (c) and are fixed by tightening of bolts (d) passing through members (a), (b) and (c) and nuts (f). Thereby, opposite end portions of the toothed-belt (a) are connected with each other, thereby forming an endless belt.

The above described conventional arrangement has the following problems.

That is to say, in a case where a distance between axes of pulleys over which passes the endless toothed-belt is constant, when opposite end portions of the toothed-belt (a) are connected with each other to form the endless belt, such connection is carried out under a condition that some tension is imparted to the belt (a). However, in the above described connecting method, it is very difficult to achieve connection while the toothed-belt (a) is being pulled by a constant force. Furthermore, since the toothed-belt (a) is pulled by a pitch of the teeth at a time, the tension is imparted stepwise, such that fine regulation of the tension is impossible.

SUMMARY OF THE INVENTION

The present invention has been achieved in view of the above described conventional disadvantages, and it is an object of the present invention to provide a toothed-belt fixing mechanism capable of fixing one end portion of a toothed-belt or of connecting opposite end portions thereof under conditions that a predetermined tension may be imparted to the belt by a simple operation.

In order to achieve the above described object, one end of a toothed-belt is inserted a toothed-pulley rotatable only in one direction and a guide member provided so that a predetermined gap is formed between the guide member and peripheral teeth of the toothed-pulley, with the teeth of the toothed-belt engaging with the peripheral teeth of the toothed-pulley.

In a case where the other end of the toothed-belt is fixed, then the portion of the guide member, which faces the toothed-belt is made smooth.

With this construction, if the one end of the toothed-belt, fixed at the other end thereof by suitable means, is inserted between the toothed-pulley and the guide member, a predetermined initial tension is applied to the belt by pulling the inserted end of the belt by means of a spring scale or the like. When such pulling is stopped, the toothed-pulley is not rotated in an opposite direction so that the toothed-belt is fixed at that position, thereby maintaining the predetermined tensioned or strained condition on the belt.

In a case where extension is produced in the toothed-belt, the tension on the belt can be regulated merely by pulling the end portion of the belt inserted between the toothed-pulley and the guide member.

In the guide member may comprises another toothed-pulley rotatable only in a direction opposite to the direction of rotation of the toothed-pulley of the above described construction. Both pulleys are rotatably mounted on one movable member so that a predetermined gap is formed between peripheral teeth of the two toothed-pulleys. Opposite end portions of a toothed-belt passed over a plurality of pulleys different from the above pulleys are inserted between the two toothed-pulleys with such end portions positioned back-to-back and with the teeth of the belt engaging with the peripheral teeth of the two toothed-pulleys.

In such case, the two end portions of the toothed-belt can be connected with each other to form an endless belt.

With the above described construction, both end portions of the toothed-belt are inserted between the toothed-pulleys from the direction in which the toothed-pulleys can be rotated, with the two end portions positioned back-to-back, and the inserted ends of the toothed-belt are, for example, pulled by means of a spring scale to impart the predetermined tension to the belt. Upon stopping such pulling, the toothed-pulleys cannot rotate in opposite directions, so that the two end portions of the toothed-belt are fixed at such positions connected with each other, thereby forming an endless bent maintained under the predetermined tensioned or strained condition.

In a case where extension is produced in the toothed-belt, the tension of the belt can be regulated merely by pulling the end portions of the belt inserted between the two toothed-pulleys.

BRIEF DESCRIPTION OF THE DRAWINGS

FIGS. 1 to 5 show preferred embodiments of the present invention employing fixation of one end portion of a belt, and wherein:

FIG. 1 is an enlarged sectional view showing principal parts of a toothed-belt fixing mechanism according to the present invention;

FIG. 2 is a schematic sectional view showing an optical system travel type copying machine;

FIG. 3 is a perspective view showing principal parts of such optical system travel type copying machine;

FIG. 4 is a schematic side view showing principal parts of another preferred embodiment of the present invention; and FIG. 5 is an enlarged sectional view showing principal parts of a toothed-belt fixing mechanism of another preferred embodiment according to the present invention;

FIGS. 6 to 8 show a preferred embodiment of the present invention employing connection together of opposite end portions of a belt to form an endless belt, and wherein:

FIG. 6 is an enlarged sectional view showing principal parts to a toothed-belt connecting mechanism according to the present invention;

FIG. 7 is a schematic side view showing a toothed-belt connecting mechanism; and FIG. 8 is a perspective view showing principal parts of a driving apparatus of an automatic door employing the toothed-belt connecting mechanism of FIGS. 7 and 8.

DESCRIPTION OF THE PREFERRED EMBODIMENTS

The preferred embodiments of the present invention are described below with reference to the drawings.

Figure 2:
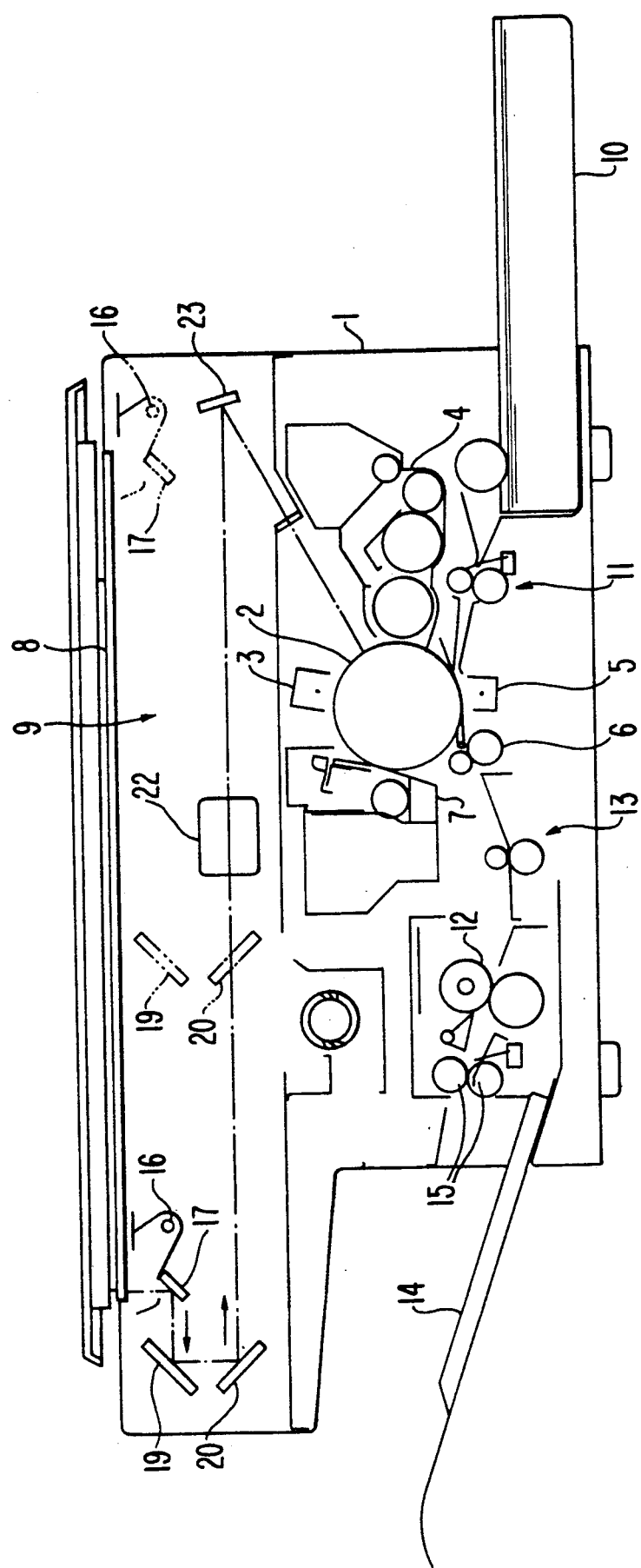

FIG. 2 shows an optical system travel type copying machine in which the toothed-belt fixing mechanism according to the present invention is employed as an optical system driving apparatus. The copying machine comprises a drum photoreceptor 2 mounted on a body 1 of the copying machine, a charging apparatus 3, a developing apparatus 4, a transferring apparatus 5, a paper-separating apparatus 6, a cleaning apparatus 7 for removing residual toner from the photoreceptor 2, an optical system travel type exposure apparatus 9 provided in a space below a manuscript table 8, a paper supply and transfer apparatus 11 for transferring papers housed in a cassette-case 10 to transferring apparatus 5, a copied paper-transferring apparatus 13 for transferring the separated papers to a fixing apparatus 12, and a pair of paper discharge rollers 15 for discharging fixed papers to a tray 14.

Figure 3:
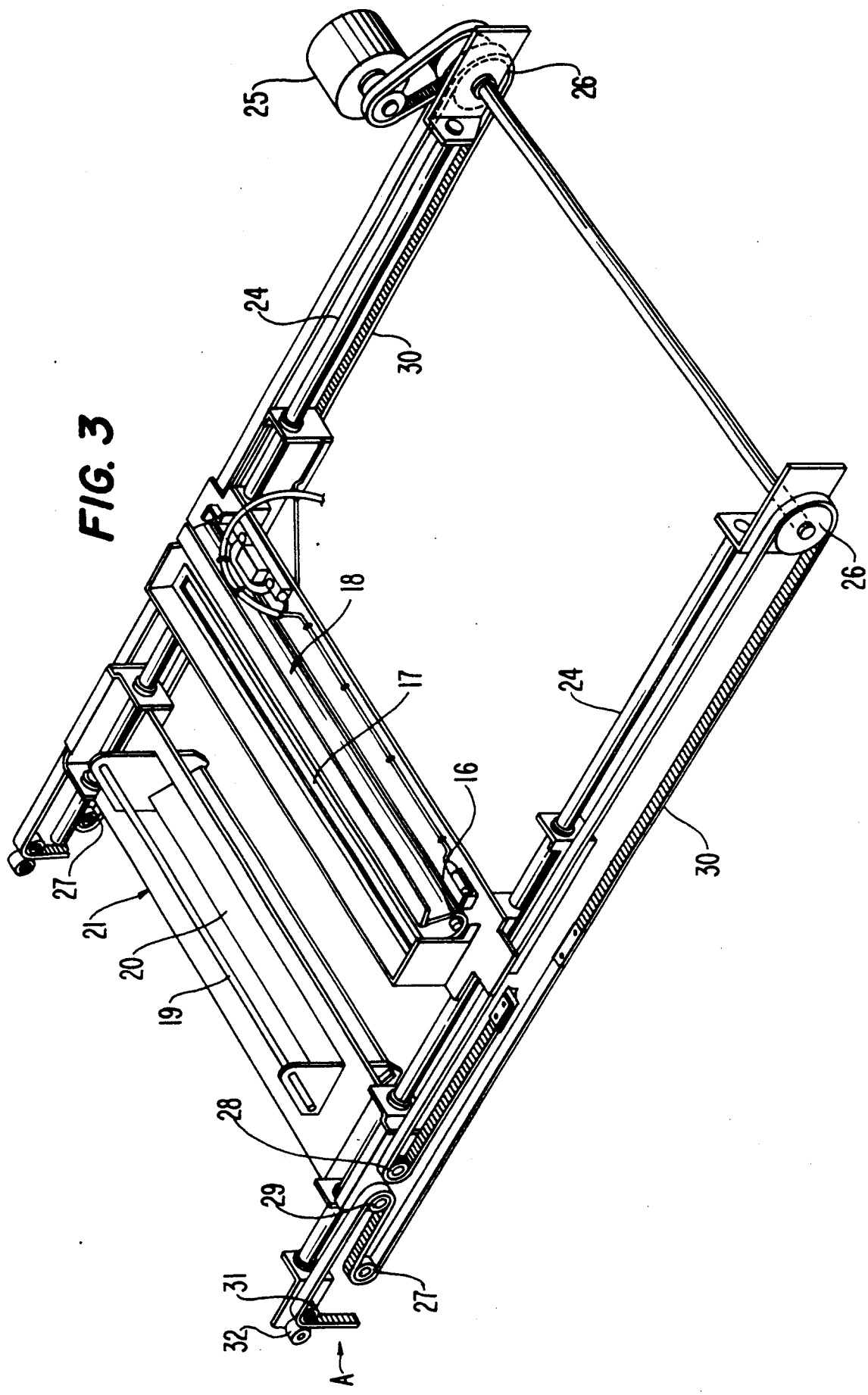

The optical system travel type exposure apparatus 9 comprises a first optical traveler 18 including a light source 16 and a first mirror 17, a second optical traveler 21 including a second mirror 19 and a third mirror 20, an image-forming lens 22, a fourth mirror 23, and the like, so that the first optical traveler 18 may be reciprocated at a speed twice that of the second optical traveler 21, as shown in FIGS. 2 and 3.

The construction of the optical system driving apparatus for reciprocating the first optical traveler 18 at a speed twice that of the second optical traveler 21 is as follows.

That is to say, as shown in FIG. 3, a pair of front and rear guide rods 24 are disposed in parallel in a space above body 1 of the copying machine along the moving direction of the optical system so that opposite ends of the first optical traveler 18 and opposite ends of the second optical traveler 21 are slidably supported by guide rods 24.

A pair of driving pulleys 26 provided with teeth formed on peripheral surfaces thereof and driven by a motor 25 and passive pulleys 27 having flat peripheral surfaces are rotatably mounted at respective opposite end positions of body 1 of the copying machine. On each side of the body 1 are provided movable pulleys 28, 29 provided with teeth formed on peripheral surfaces thereof and rotatably mounted on respective ends of the second optical traveler 21.

Each of front and rear toothed-belts 30 is mounted at a respective side of body 1 of the copying machine at one end thereof and is wound around the movable pulley 28, the driving pulley 26, the passive pulley 27 and the movable pulley 29 in that order. The other end portion of each toothed-belt 30 is mounted on the body 1 of the copying machine of the mechanism of the invention. Opposite ends of the first optical traveler 18 are connected with toothed-belts 30 at positions between respective movable pulleys 28 and driving pulleys 26.

Such one end of each of the toothed-belts 30 is conventionally put between plates and fixed by screws and the like to first optical traveler 18, but the other end is fixed by means of a toothed-belt fixing mechanism A.

Figure 1:
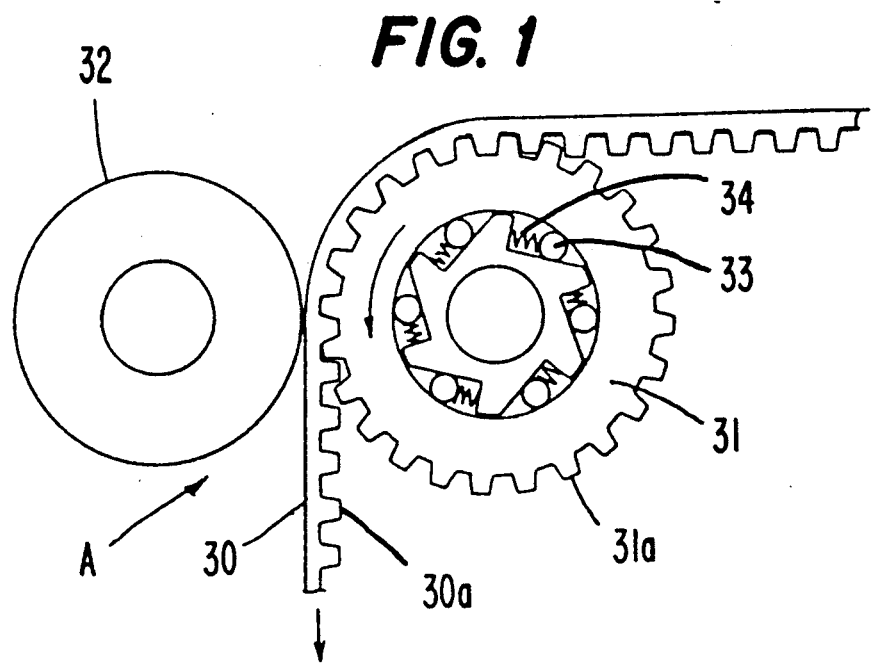
Figure 9:
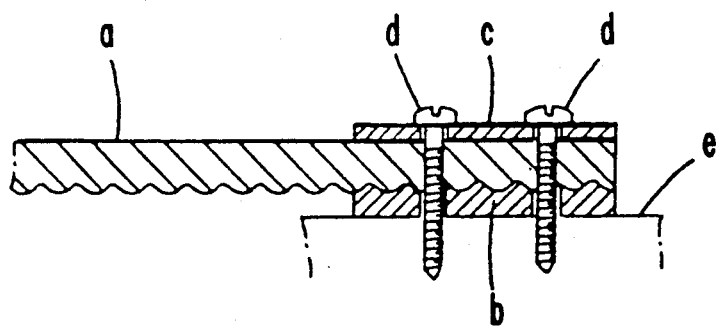
FIGS. 9 and 10 are partial sectional views showing conventional connecting arrangements.
Figure 10:
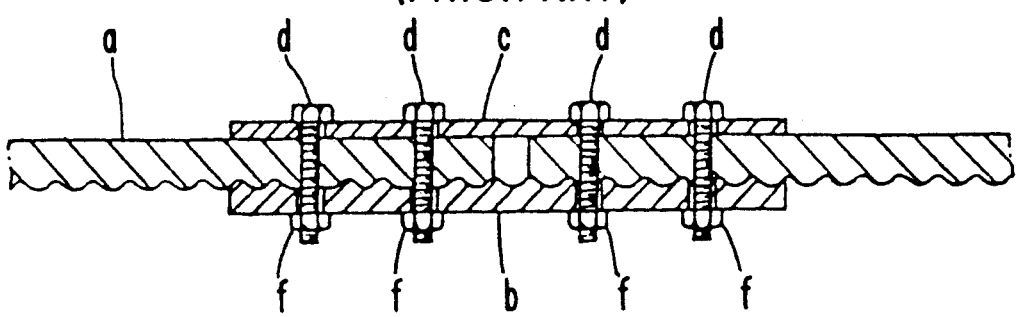

Toothed-belt fixing mechanism A, as shown in FIG. 1, comprises a toothed-pulley 31 rotatable in only one direction (shown by an arrow) and a guide member 32 composed of a roller rotatable around an axis parallel to the axis of toothed-pulley 31 and having a smooth peripheral surface so that a predetermined gap may be formed between peripheral teeth 31a of toothed-pulley 31 and the peripheral surface of the guide member 32. The other end of toothed-belt 30 is inserted between members 31, 32 from the direction in which the toothed-pulley 31 can be rotated, to engage teeth 30a of toothed belt 30 with the peripheral teeth 31a of toothed-pulley 31. The gap between the peripheral teeth 31a of the toothed-pulley 31 and the peripheral surface of the guide member 32 is set in size so that the surface of the toothed-belt 30 opposite to teeth 30a will frictionally contact or adhere to the peripheral surface of the guide member 32, or even through a space is formed therebetween, the width of such space is less than the height of the teeth 30a of the toothed-belt 30 with the toothed-belt 30 inserted into the gap.

Figure 4:
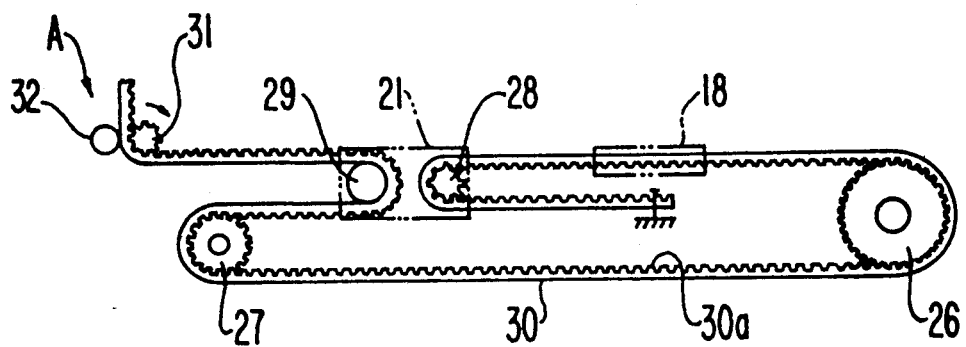

In addition, although not shown, the above described toothed-belt fixing mechanism A may be provided on both ends of the respective toothed-belts 30. Furthermore, the respective toothed-belts 30, as shown in FIG. 3 is formed of two pieces or length portions that are connected with each other at a central portion in the longitudinal direction of the belt, such two length portions being upside down with respect to each other, such that teeth on opposite sides of the belt are engaged with the teeth of two movable pulleys 28, 29 mounted on the second optical traveler 21. However, in the case where the passive pulley 27 is toothed and one of the movable pulleys 29 has a smooth peripheral surface, as shown in FIG. 4, it is unnecessary to alternate the teeth of the belt at the central portion thereof. Accordingly, it is unnecessary to form the belt of two pieces or portions that are connected to each other.

Also, although a stepless one-way clutch provided with steel balls 33 and springs 34 pressing steel balls 33 between flat inner surfaces of outer rims and inclined surfaces of inner rims, as shown in FIG. 1, is used as means for enabling the toothed-pulley 31 to rotate only in one direction (shown by an arrow) in the above described respective preferred embodiments, a ratchet-type one-way clutch using ratchet pawls in place of the steel balls 33 may be used. In such case, it is desired that the pitch of gears on the inner surfaces of the outer rims, with which the ratchet pawls are engaged, be reduced as much as possible so that the quantity of the belt moved by the rotation of the toothed-pulley 31 per one pitch may be less than the pitch of the teeth 30a of the toothed-belt 30.

Figure 5:
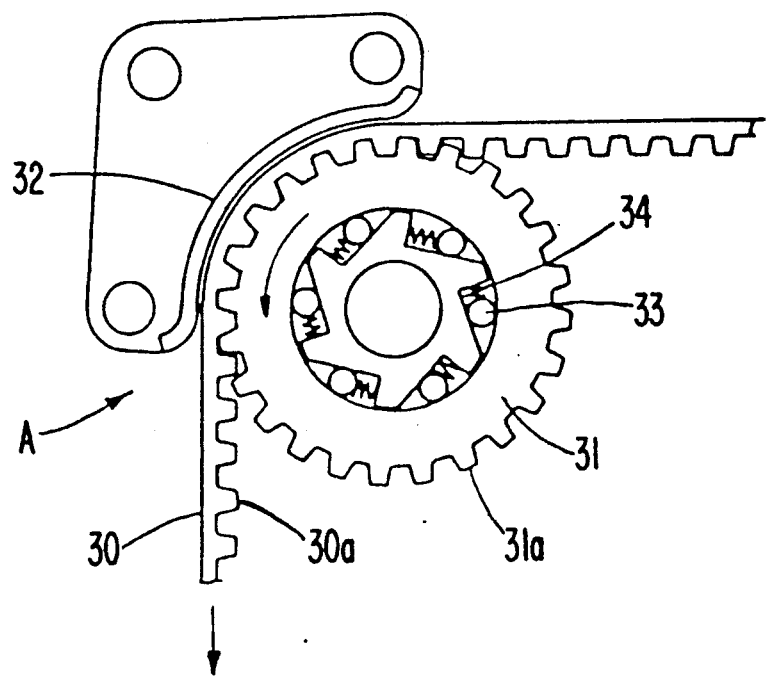

Further, a plate-like guide member 32 as shown in FIG. 5 may be used in place of the roll shown in FIG. 1.

With the above described construction, the other end of the toothed-belt can be fixed merely by the simple operation inserting such other end between the toothed-pulley and the guide member from the direction in which the toothed-pulley can be rotated and pulling such end. In addition, an accurate initial tension can be imparted to the belt by pulling such end of the belt inserted between the toothed-pulley and the guide member by means of a spring scale. In particular, the fine regulation of the tension is possible by using the stepless one-way clutch or a ratchet-type one-way clutch having a reduced pitch of gears as the means for enabling the toothed-pulley to rotate only in one direction.

In addition, in the case where extension is produced in the toothed-belt, the tension can be regulated by merely pulling the end of the belt inserted between the toothed-pulley and the guide member.

The preferred embodiment in which the present invention is applied to a case where opposite end portions of the belt are connected with each other to form an endless belt is described below with reference to FIGS. 6 to 8.

Figure 8:
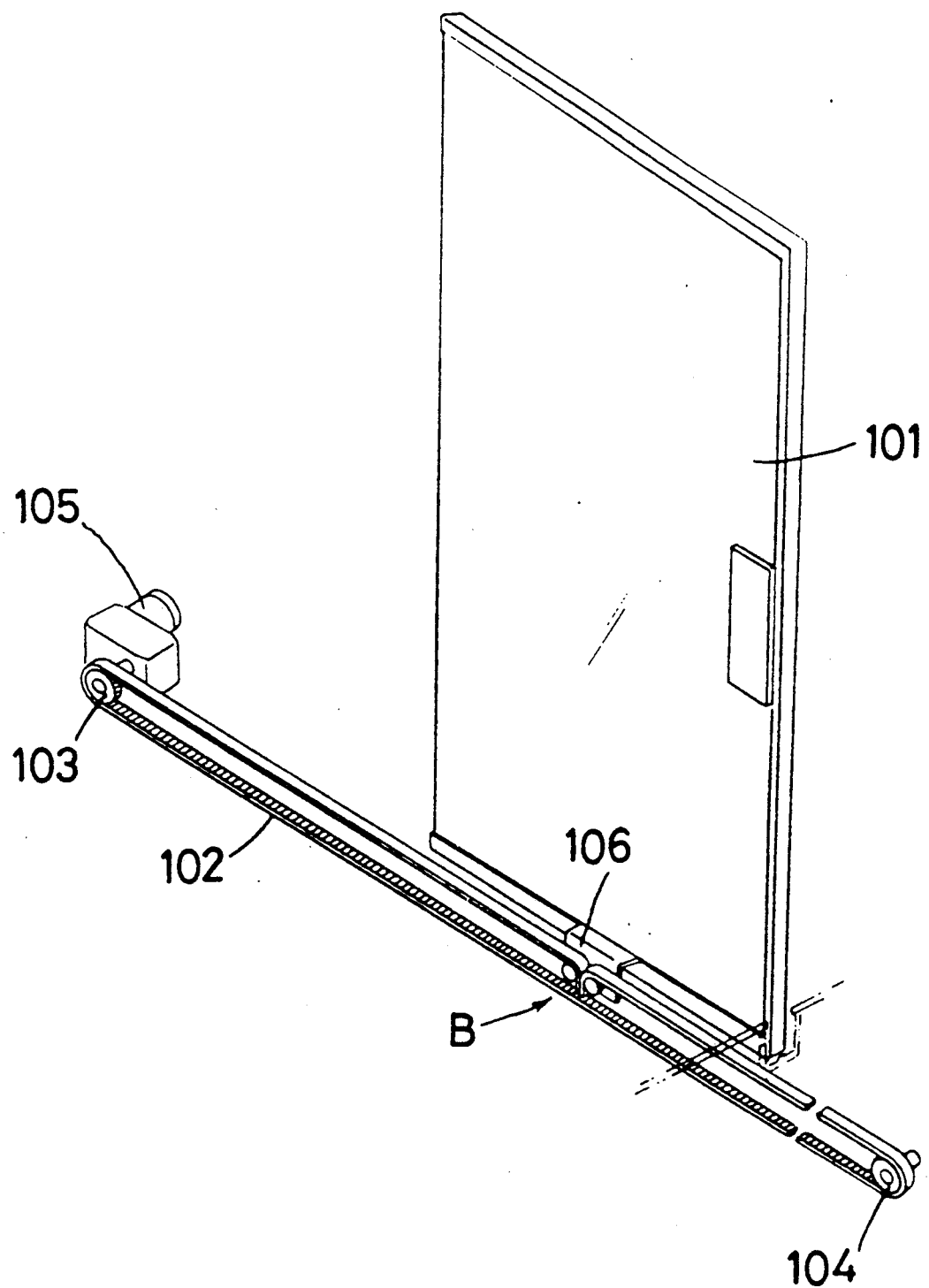

FIG. 8 shows a driving apparatus of an automatic door employing a toothed-belt fixing mechanism (B) according to the present invention. Referring to the drawings, reference numeral 101 designates a door, reference numeral 102 designates an endless toothed-belt passing around a pulley 103 on the driving side and a pulley 104 on the trailing side. Reference numeral 105 designates a motor for driving pulley 103 in regular and reverse directions. Reference numeral 106 designates a movable member, door 101 being connected with movable member 106.

Figure 6:
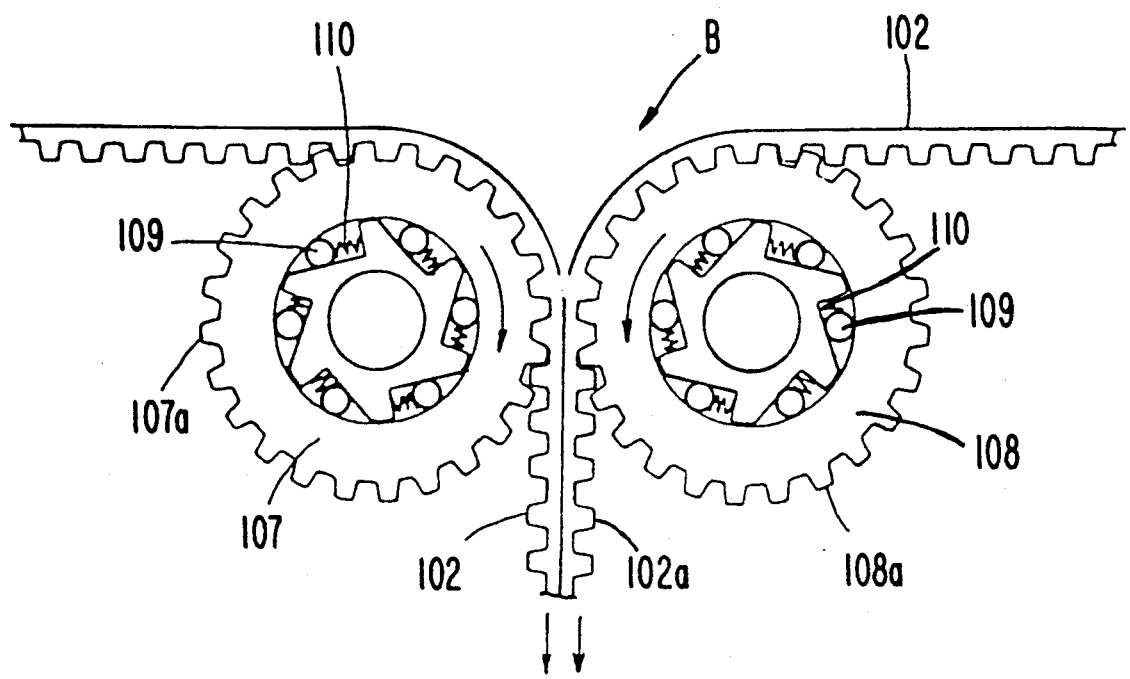
Figure 7:
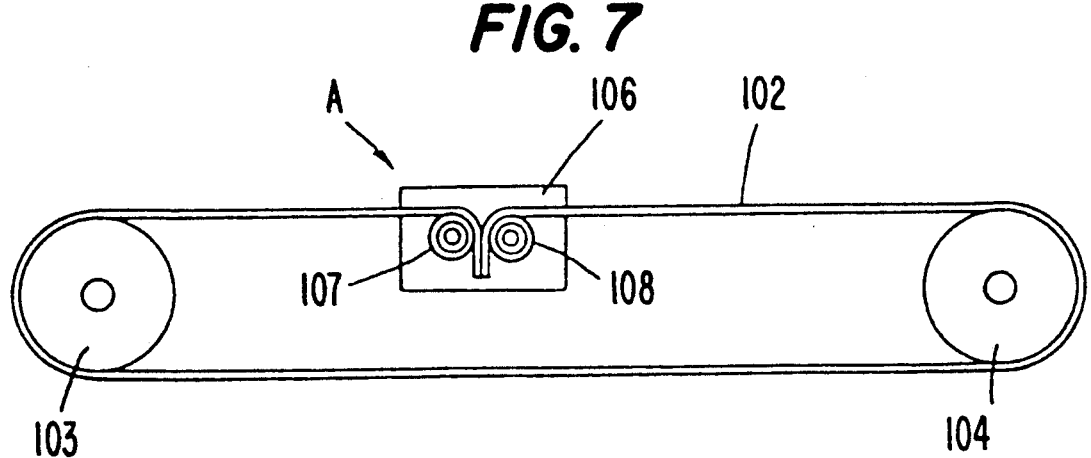

Toothed-belt fixing mechanism (B), as shown in FIGS. 6 and 7, comprises a toothed-pulley 107 rotatable only in a clockwise direction and a toothed-pulley 108 rotatable only in a counterclockwise direction and rotatably mounted on movable member 106 so that a predetermined gap may be formed between peripheral teeth 107a of toothed-pulley 107 and peripheral teeth 108a of toothed-pulley 108. Opposite end portions of the toothed-belt 102 pass over pulley 103 on the driving side and pulley 104 on the trailing side and are inserted between toothed-pulleys 107, 108 in a back-to-back manner. The teeth 102a of opposite ends of belt 102 engage with the peripheral teeth 107a of toothed-pulley 107 and with the peripheral teeth 108a of toothed-pulley 108. The gap between the peripheral teeth 107a of toothed-pulley 107 and the peripheral teeth 108a of toothed-pulley 108 are set in size so that rear or non-toothed surfaces of the opposite ends of toothed-belt 102 which are inserted back-to-back will engage or be adhered to each other, or even though a space is produced between the rear surfaces of the belts, the width of such space will be less than the height of the teeth of toothed-belt 102.

In addition, although stepless one-way clutches provided with steel balls 109 and springs 110 pressing steel balls 109 between flat inner surfaces of outer rims and inclined surfaces of inner rims, as shown in FIG. 6, is used as the means for enabling one-way rotation of the toothed-pulleys 107,108, i.e. only in the directions shown by arrows (clockwise direction or counterclockwise direction) in this preferred embodiment, also ratchet-type one-way clutches using ratchet pawls in place of the steel balls 109 may be used. In such case, fine regulation of the tension on the belt is possible by reducing a pitch of gears on the inner surface of the outer rim with which the ratchet pawls are engaged, as much as possible so that the quantity of the belt moved by the rotation of the toothed-pulleys 107, 108 per one pitch will be less than the pitch of the teeth 102a of the toothed-belt 102.

In addition, although this embodiment of the present invention has been described with respect to a driving apparatus of an automatic door, the toothed-belt fixing mechanism (B) according to the present invention can be applied to every apparatus in which an endless toothed-belt is used to reciprocate a movable member, such as apparatus for driving a printing head of a printer, an industrial sewing machine and apparatus for moving or driving a car truck of a robot.

With the above described construction, opposite end portions of the toothed-belt can be connected to each other to form an endless belt merely by inserting the opposite end portions between the toothed-pulleys from the direction in which the toothed-pulleys can be rotated with the opposite end portions of the toothed-belt positioned back-to-back, and pulling the inserted ends of the belt. Furthermore, an accurate tension can be imparted to the belt by pulling the inserted ends of the belt by use of a spring scale. In particular, fine regulation of the tension is possible by using stepless one-way clutches or ratchet-type one-way clutches having a reduced gear pitch as means for enabling rotation of the toothed-pulleys only in the predetermined directions.

Further, in the case where extension is produced in the toothed-belt, tension can be regulated merely by pulling the inserted ends of the belt between the toothed-pulleys.

What is claimed is:

1. In an assembly comprising a toothed belt having first and second opposite ends, and means for fixing said opposite ends in predetermined positions, the improvement wherein said fixing means comprises a mechanism for fixing at least said first end in a manner to impart a predetermined tension to said belt, said mechanism comprising:

a non-driven toothed pulley having peripheral teeth and mounted for rotation in only a single direction about an axis;

a guide member mounted at a position spaced from said toothed pulley to define a gap between said guide member and said peripheral teeth of said toothed pulley; and at least said first end of said belt being inserted in said gap with teeth of said belt engaging said peripheral teeth of said toothed pulley, such that said inserted end may be pulled through said gap and said toothed pulley rotates in said single direction, to thereby impart said predetermined tension to said belt, and whereby when such pulling is stopped said toothed pulley is prevented from rotating in a direction opposite to said single direction.

2. The improvement claimed in claim 1, wherein said toothed pulley includes a one-way clutch enabling rotation of said toothed pulley in said single direction and preventing rotation thereof in said opposite direction.

3. The improvement claimed in claim 1, wherein said second end of said belt is fixed at a location spaced from said mechanism, and said guide member has a smooth surface defining said gap with said toothed pulley.

4. The improvement claimed in claim 3, wherein said guide member comprises a roller rotatable about an axis.

5. The improvement claimed in claim 3, wherein said guide member comprises a plate-like member.

6. The improvement claimed in claim 1, wherein said guide member comprises another toothed pulley having peripheral teeth and mounted for rotation about an axis in only a single direction opposite to said direction of rotation of said first-mentioned toothed pulley, said axes of rotation of both said toothed pulleys are mounted on a movable member, said belt is passed over a plurality of additional pulleys, and both said first and second ends of said belt are inserted in said gap between said two toothed pulleys, with said teeth of said first end of said belt engaging said peripheral teeth of said first-mentioned toothed pulley and with said teeth of said second end of said belt engaging said peripheral teeth of said another toothed pulley.

* * * * *